United States Patent [19]

Fine

[11] Patent Number: 5,360,151
[45] Date of Patent: Nov. 1, 1994

[54] EASY TO LOAD VEHICLE-TOP CARRIER FOR BICYCLES

[76] Inventor: Richard A. Fine, 5 Eden La. West, Mercer Island, Wash. 98040

[21] Appl. No.: 92,720

[22] Filed: Jul. 16, 1993

[51] Int. Cl.$^5$ .............................................. B60R 7/00
[52] U.S. Cl. ................................. 224/310; 224/309; 224/319
[58] Field of Search ......... 229/310, 309, 314, 42.03 B, 229/42.07, 42.08, 315, 319, 320, 321, 324, 325, 326, 329, 330

[56] References Cited

U.S. PATENT DOCUMENTS 4,728,244 3/1988 Stokkendal ........................... 224/319

FOREIGN PATENT DOCUMENTS 3335173 4/1985 Germany ............................ 224/310

Primary Examiner—Henry J. Recla
Assistant Examiner—David J. Walczak

[57] ABSTRACT

A vehicle-top carrier for bicycles which allows bicycles to be attached alongside the vehicle, then pivoted up to its top. A base is attached to the vehicle. A rack pivots from the base about a generally horizontal axis, between a vehicle-top carrying position and a loading position extending horizontally outward from the vehicle. A bicycle can be attached to the underside of the extended rack and pivoted to the vehicle top for transport.

19 Claims, 4 Drawing Sheets

EASY TO LOAD VEHICLE-TOP CARRIER FOR BICYCLES

BACKGROUND

1. Field of Invention

This invention relates to vehicle-top bicycle carriers, specifically to such carriers which facilitate lifting the bicycle to the vehicle top and which have alternative use as a repair stand.

2. Description of Prior Art

A- Loading

As bicycling became attractive to adults as a hobby, a need developed for transporting bicycles to and from riding locations. Bicycles are ungainly things that don't pack easily, so carrying them by car is awkward. At first Bicyclists devised home-made carriers, such as one described in *The Complete Book of Bicycling*, 1970. This was a common utility-type carrier consisting of two parallel bars attached to the car's rain gutters. Bicycles were carried in an inverted position with their seats strapped to one bar and their handlebars to the other. Alternate bikes were oriented forward and rearward for a compact fit.

As the hobby grew, commercial carriers designed specifically for bicycles became available. Several inventors devised specific ways to support a bicycle on a roof rack, such as those shown in U.S. Pat. Nos. 4,524,893 to Cole (1985), 4,452,384 to Graber (1984), 3,901,421 to Kalicki (1975), and 3,931,919 to Gerber and Benson (1976). None of these, however, address the problem of lifting the bicycle to the rack.

To reduce the difficulty of loading, carriers which attach to lower parts of the vehicle have been devised. An example which carries the bicycle over the trunk is shown in U.S. Pat. No. 5,056,700 to Blackburn and Lee (1991). While this somewhat reduces the lifting, it leaves the bicycles vulnerable to damage from minor traffic accidents. Other carriers which attach to the front or rear bumper leave the bicycles even more vulnerable.

Besides leaving the bicycle vulnerable, the front, rear, and trunk-mounted carriers have another limitation: They can't accommodate the extra length of tandem bicycles. Thus the heaviest and most awkward bicycles can't use the easier-to-load carriers. The problem of loading tandem bicycles is so difficult that many people buy long vans that they would not otherwise want, or expensive specialty trailers.

While several inventions have been made which facilitate loading of car-top carriers, non are particularly applicable to the uniquely delicate and awkward bicycle. Considerable attention has been given to the loading of boats, for example. U.S. Pat. No. 4,603,798 to Griswold (1986) shows loading a boat by lifting one end to a pivot, then lifting the other end and walking it around to a mounting bar. U.S. Pat. No. 4,630,990 to Whiting (1986) describes a roller on which the boat can be placed, then pushed to a mounting position. The invention shown in U.S. Pat. No. 3,885,689 to Grove et al. (1975) lifts the bow until the boat is in a vertical position behind the vehicle, then pivots it to horizontal above the vehicle. Each of these is particularly well suited to the specific problem of boat loading, but not adaptable for loading a bicycle U.S. Pat. Nos. 3,762,587 to Longee (1973) and 3,746,194 to Koenig (1973) show pivoted platforms for raising a boat to the top of a pickup-mounted camper. These are not conveniently adaptable to cars and vans because they require a side-mounted pivot, and the loading position would be awkward for a bicycle. Further, they are too complex, expensive, and cumbersome for use with bicycles.

A somewhat similar device for storing elongated articles on a vehicle is described in U.S. Pat. No. 3,013,681 to Garnett (1961). It shows loading an object such as a ladder by pivoting it from a position extending from the side of the vehicle to an upright position above the vehicle. This appears to require a truck to provide a reasonable pivot location. The device doesn't adapt well to cars and vans. If the pivot axis is above the vehicle the load will be carried too high, and if the pivot is at the vehicle side it is difficult to build. In any case the loading position would be awkward for bicycles. Garnett also shows an alternative where the holder hangs vertically alongside the vehicle and pivots to an upright position above the vehicle. This also appears unsuitable for bicycles; a frame in the lowered position would be awkward for attaching a bicycle, and extremely awkward for attaching more than one.

Several inventions have been made in which a load is placed on a vertical or inclined platform beside the car, then moved to the car top by a combination of rotation and lateral movement. In U.S. Pat. No. 4,826,387 (1989), Audet shows a carrier for ladders, pipes, and the like. It hangs from the side of a roof rack for loading. It is pivoted to horizontal, then pushed toward the center of the vehicle. A similar device for spare tires is shown in U.S. Pat. No. 4,350,471 to Lehmann (1982). U.S. Pat. Nos. 4,682,719 to Ernst et al. (1987) and 4,291,823 to Freeman et al. (1981) work in a similar way, with a luggage-carrier type of frame. The devices described by Ernst in U.S. Pat. No. 4,240,571 (1980) and by Edgerton in U.S. Pat. No. 4,003,485 (1977) accept their load similarly, in an inclined position. In these the load is first pushed up the incline, then pivoted to the vehicle top. None of the inclined-loading devices is convenient for bicycles, because the bicycles would have to be lifted to an awkward attitude for loading. Their complexity and expense are further disadvantages.

B- Field Maintenance

Another problem faced by bicyclists is the difficulty of supporting a bicycle during repairs. In shops bicycles are commonly supported on stands which clamp to their frames and leave the wheels and other moving parts free. This is convenient for adjusting such items as shifters and brakes which require operation of the pedals and wheels.

It is frequently necessary to perform maintenance away from home. Bicycles are relatively delicate because of the need to minimize weight, and therefore need occasional adjustment and repair. In the field it is awkward to perform such maintenance. The old method of turning the bicycle upside down generally can't be used because it damages such parts as brake levers and cables. An attachment for utility roof-top carriers has been invented, U.S. Pat. No. 4,887,754 to Boyer et al. (1989). It attaches to one of the carrier bars of a common roof-top utility carrier, and has a clamp to hold the bicycle frame. This appears to be a satisfactory work stand, but does require purchasing and transporting the special-purpose device. It doesn't attempt to solve the loading problem.

OBJECTS AND ADVANTAGES

Accordingly, several objects and advantages of the present invention are:

(a) to provide a carrier for the transport of bicycles by vehicles, which facilitates loading, (b) to provide a carrier which is applicable to a wide range of bicycles including tandem bicycles, (c) to provide a carrier which serves as a convenient bicycle holder for performing maintenance, (d) to provide a carrier which minimizes the exposure of bicycles to damage from minor traffic accidents, (e) to provide a carrier which securely holds bicycles without damaging painted or delicate parts, (f) to provide a carrier which transports bicycles without requiring any disassembly such as wheel removal, (g) to provide a carrier which minimizes the chance of damaging the bicycle or vehicle during loading, (h) to provide a carrier which reduces the probability of injury to a person during loading, and (i) to provide a carrier that can be produced at a reasonable cost.

Still further objects and advantages will become apparent from consideration of the ensuing description and drawings.

SUMMARY OF THE INVENTION

The invention is a carrier for transporting bicycles on a vehicle roof, including a rack which can be pivoted to a convenient position beside the vehicle for loading or unloading. A base is provided which can be mounted in a fixed position relative to the vehicle roof. A rack for receiving and supporting bicycles is attached to the base such that it can pivot about an essentially horizontal axis, from a substantially horizontal position above the vehicle roof to a substantially horizontal position extending outward from the vehicle. The rack carries devices for releasably attaching at least one bicycle, which are operable in the outward-extended position. When a bicycle is attached it can be pivoted easily between a vehicle-top position for transporting, and an outward-extended position for convenient loading and unloading. A releasable restraint is provided to secure the rack in the vehicle-top position during transport.

DRAWING FIGURES

REFERENCE NUMERALS IN DRAWINGS

| # | |
|---|---|
| 10 | car |
| 11 | bicycle |
| 12 | utility carrier |
| 13 | front handlebar |
| 14 | rear handlebar |
| 20 | rack assembly |
| 21 | inner rack assembly |
| 22 | outer rack assembly |
| 23 | latch assembly |
| 24 | seatpost-clamp assembly |
| 25 | alternate rack assembly |
| 30 | fixed arm |
| 31 | hinge pin |
| 32 | hinged arm |
| 33 | tube |
| 34 | U-bolt |
| 35 | J-bolt |
| 36 | wing nut |
| 37 | chord |
| 38 | hinged post |
| 39 | nut |
| 40 | spring clip (hinge) |
| 41 | washer (hinge) |
| 42 | elastic chord |
| 43 | knot (chord) |
| 44 | knot (elastic chord) |
| 45 | tape |
| 46 | axle pin |
| 47 | washer (axle) |
| 48 | spring clip (axle) |
| 49 | pulley |
| 50 | standoff |
| 51 | threaded stud |
| 52 | knob |
| 53 | C-clip |
| 54 | transverse channel |
| 55 | mount |
| 56 | transverse tube |
| 57 | bolt |
| 58 | bicycle seat |
| 59 | bicycle handlebar |
| 60 | inner hinged arm |
| 61 | outer hinged arm |
| 62 | hinged stop |
| 63 | fixed stop |
| 64 | seat post |
| 65 | horizontal J-bolt |
| 66 | fixed axle |
| 67 | hinged tube |
| 68 | bolt |
| 69 | strap |
| 70 | buckle |
| 71 | plate |
| 72 | fixed tube |
| 73 | crutch |
| 74 | strap |
| 75 | catch |
| 76 | rivet |
| 77 | button |
| 78 | rod |
| 79 | pawl |
| 80 | latch base |
| 81 | latch axle |
| 82 | base member |
| 83 | hinged member |

DESCRIPTION

Figure 1A:
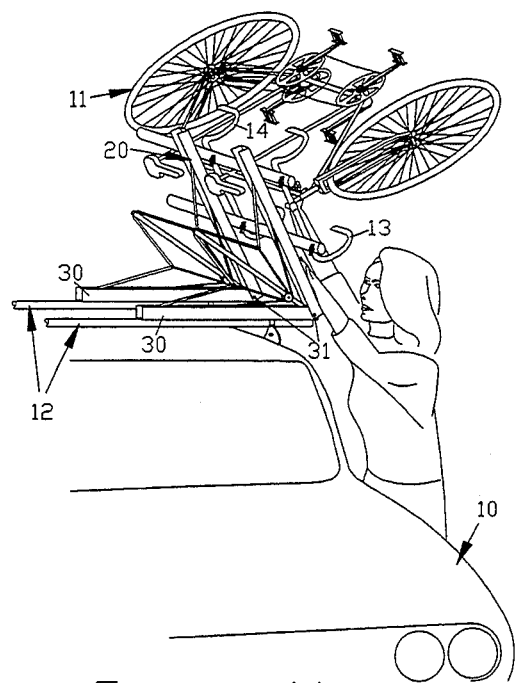
FIG. 1A is a perspective view showing a carrier configured for tandem bicycles.

The following are descriptions of presently preferred examples of the invention. FIG. 1A is a perspective view of an embodiment of the carrier intended for tandem bicycles. It illustrates the relationship of the major parts. The carrier is mounted to a utility carrier 12, of the type that includes front and rear carrier bars which attach to a car 10, transverse to its longitudinal centerline. A fixed arm 30 is attached to each of the carrier bars to serve as a base. A rack assembly 20 is connected to the outboard ends of each fixed arm 30 by a hinge pin 31. Rack 20 is for receiving and supporting a tandem bicycle 11, and provides leverage and guidance for pivoting, as will be seen below. Hinge pins 31 are colinear to allow rack assembly 20 to pivot about their axis. Tandem bicycle 11, which has a front handlebar 13 and a rear handlebar 14, is clamped to rack assembly 20 by means described below.

Figure 1B:
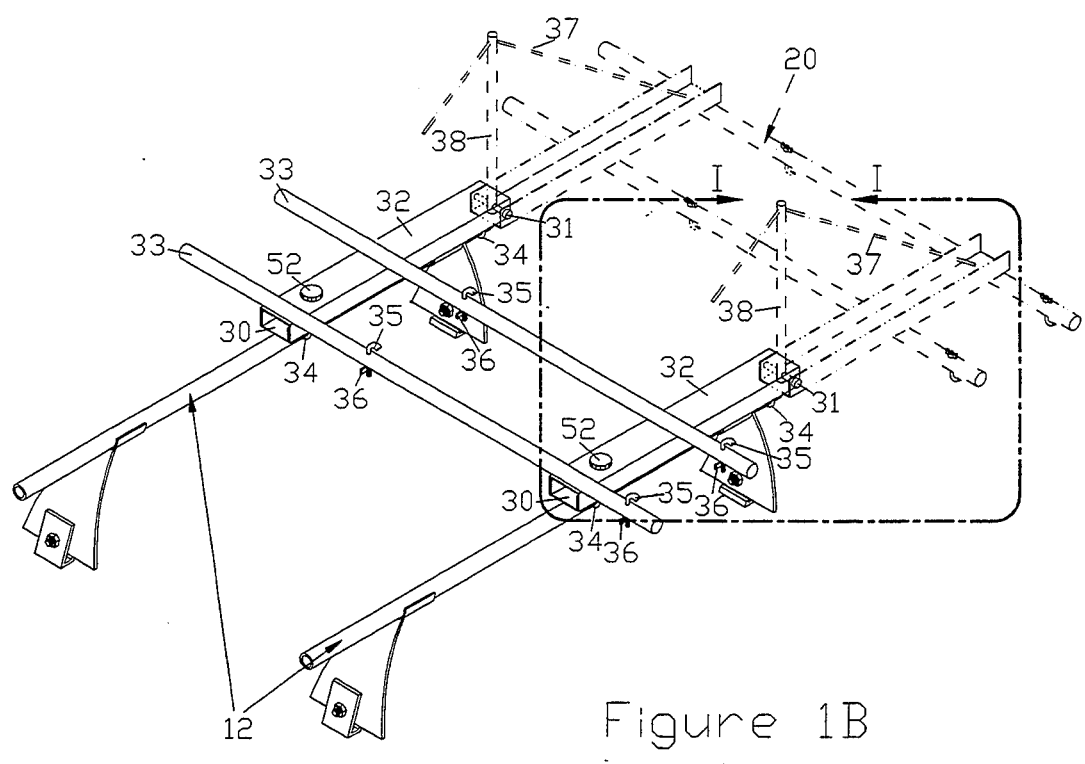
FIG. 1B is an isometric view of the carrier of FIG. 1A.

FIG. 1B shows the carrier of FIG. 1A in the closed position, with the open position indicated by phantom lines. It can be seen that rack assembly 20 consists of two longitudinal members, tubes 33, connected to two hinged arms 32. Hinged arms 32 are equal in length to fixed arms 30 and slightly wider to accommodate attachment by hinge pins 31. Two J-bolts 35 are inserted through holes in each tube 33 and retained by wing nuts 36. These are positioned to serve as attachments for handlebars 13 and 14 of bicycle 11 (FIG. 1A). Fixed arms 30 are attached to each bar of carrier 12 by a pair of U-bolts 34. This is shown more clearly in FIG. 1C. A hinged post 38 is attached by pin 31 to each pair of arms 30 and 32. A chord 37 is attached to each post 38. Together they serve to support rack assembly 20, as will be explained below.

Figure 1C:
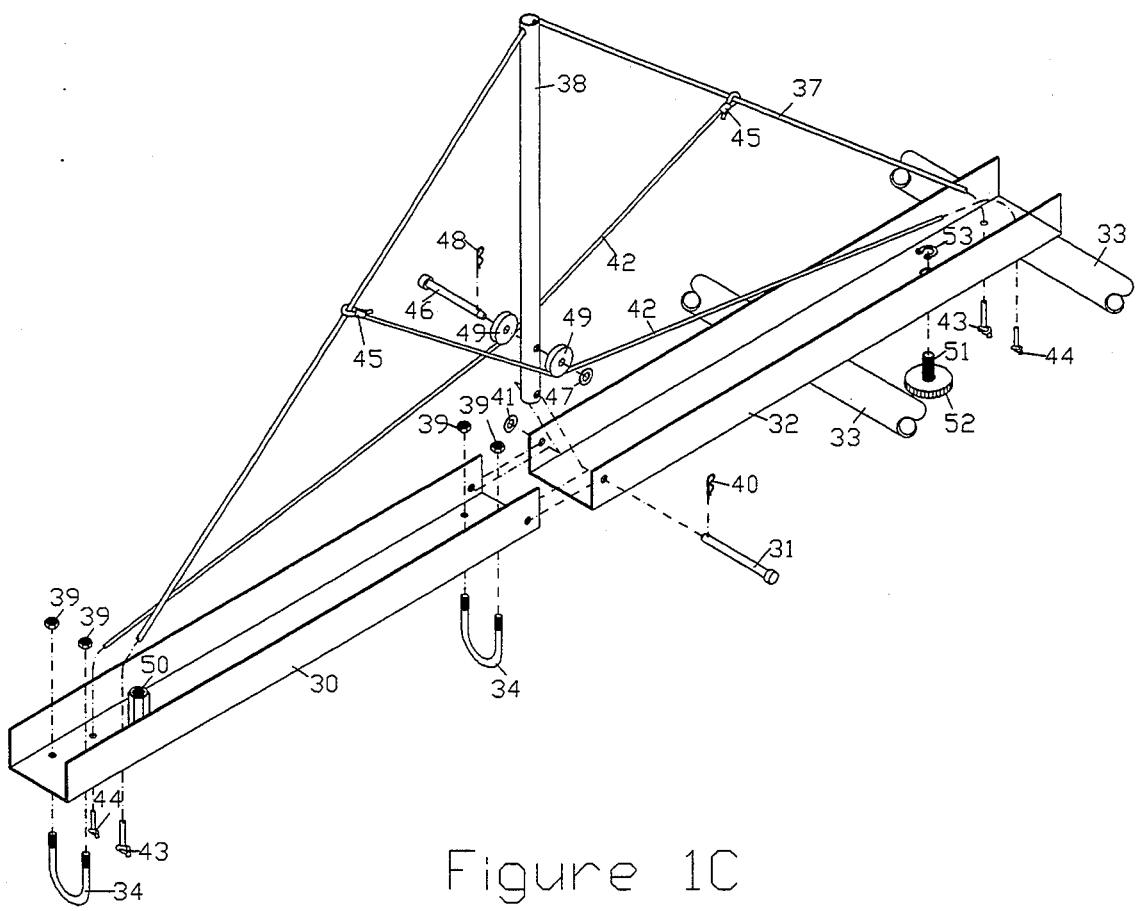
FIG. 1C is an exploded view of the area indicated by line I—I of FIG. 1B.

FIG. 1C is an exploded view showing one pair of arms 30 and 32 with all of their associated parts; the other arm pair is identical. Two U-bolts 34, each with two nuts 39 are shown. They are used to attach fixed arm 30 to one of the transverse bars of utility carrier 12 (FIG. 1B). Hinged arm 32 and hinged post 38 are connected to fixed arm 30 by hinge pin 31. Hinge pin 31 is held in place by washer 41 and spring clip 40. Chord 37, a flexible tensile member, passes through a hole near the top of post 38. Chord 37 is knotted inside of post 38 to keep it centered. One end of chord 37 is secured to arm 30 by a knot 43 and the other end similarly secured to arm 32. The length of chord 37 is such that it is taut when arm 32 is in the open position. This tension supports rack assembly 20 (FIG. 1B). When rack 20 is in the closed position, chords 37 are slack. Tension from two elastic chords 42 is used to fold each chord 37 neatly in the space between arms 30 and 32. Elastic chords 42 connect at two points on chord 37 as shown. One elastic chord 42 is looped around chord 37 between hinged post 38 and fixed arm 30. The loop is maintained by a length of tape 45. Elastic chord 42 is stretched around a pulley 49, to a hole near the end of hinged arm 31. It is secured there using a knot 44. A second elastic chord 42 is similarly looped and secured around chord 37, between post 38 and arm 32. It is stretched around the other pulley 49, and secured to arm 30 by a knot 44. Pulleys 49 are positioned on each side of post 38, to guide elastic chords 42. They are attached by an axle pin 46, which is secured by a washer 47 and a spring clip 48.

When the rack is in the closed position it can be retained using a knob 52 and a threaded standoff 50. Knob 52, which includes a threaded stud 51, is retained in a hole in hinged arm 32 by a C-clip 53. A standoff 50 with female threads is attached to fixed arm 30. Standoff 50 and knob 52 are positioned to align in the closed position.

From the description above, a number of advantages of this carrier become evident:

(a) When the rack is in the open position, it is near the position of a standing bicycle, making attachment convenient.

(b) The bicycle itself provides leverage for raising the carrier to the closed position.

(c) Hinged action controls the arc of movement, eliminating any effort required to balance or control the load.

(d) Controlled movement virtually eliminates loading accidents which could injure the user and damage the vehicle and the bicycle.

(d) The bicycle is securely mounted above the vehicle during transport, minimizing its exposure to accidental damage.

(e) No disassembly or rearrangement of the bicycle is required for loading and carrying.

(f) The bicycle is supported securely by attachment to its handlebars, so no delicate parts or appearance features will be damaged.

(g) In the open position, an attached bicycle is conveniently accessible for maintenance.

Figure 2A:
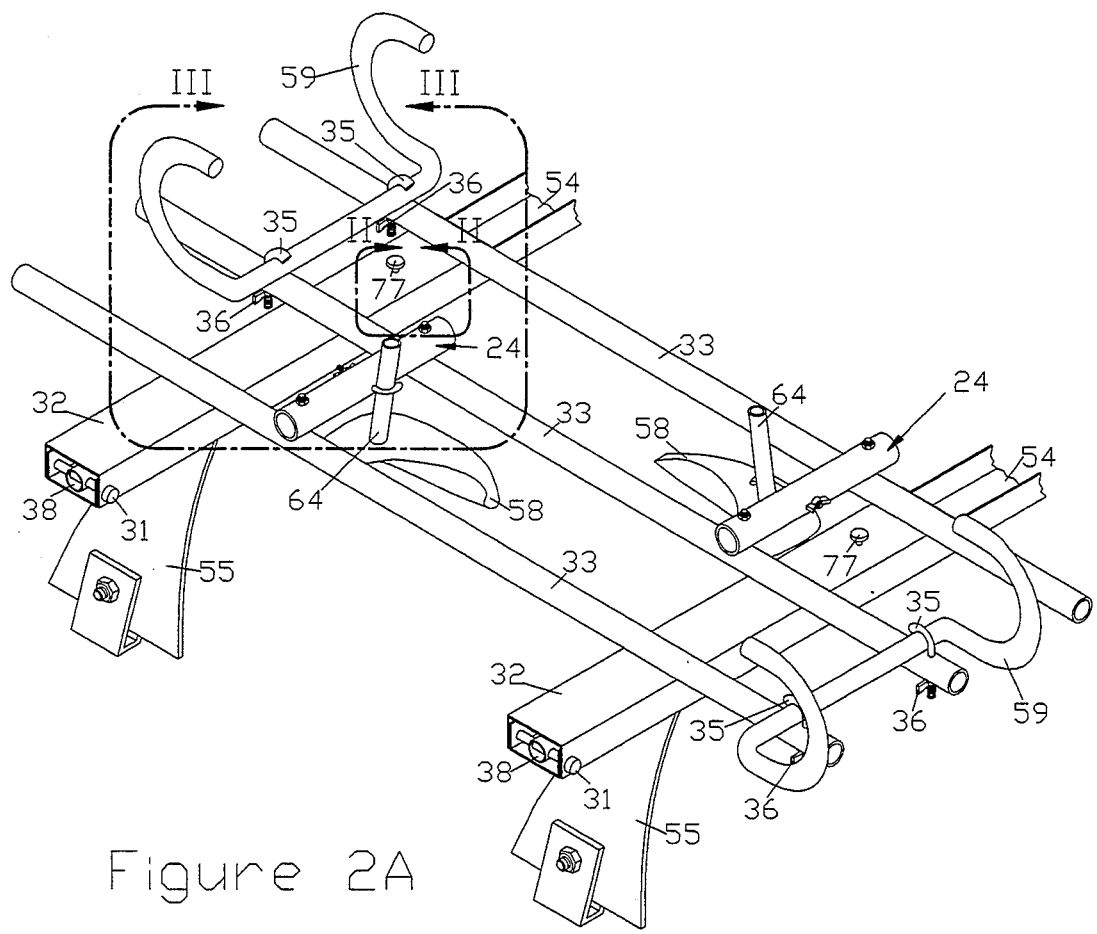
FIG. 2A is an isometric view of a carrier for transporting two single bicycles.
Figure 2B:
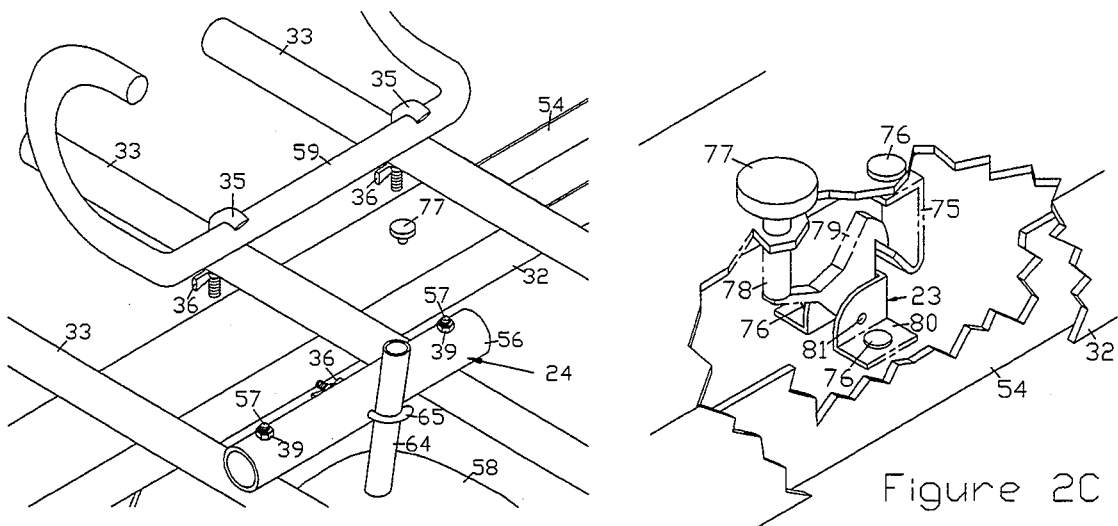
FIG. 2B is an enlarged view of area indicated by line III—III of FIG. 2A.

The carrier example shown in FIG. 2A is configured for single bicycles, and it attaches directly to the vehicle rather that to a utility carrier. For clarity one half of the carrier is shown; the other half would be a mirror image. In FIG. 2A, two transverse channels 54 have a mount 55 attached near each end for attachment to a vehicle. Mounts 55 are commonly available devices which clamp to vehicle rain gutters. Hinged arms 32 are attached to each end of channels 54 using hinge pins 31. Each hinged arm 32 is assembled with hinged post 38, chord 37 and related parts (FIG. 1C), to support arm 32 in the open position, as described above. Three tubes 33 are attached to hinged arms 32, forming a rack for receiving and supporting two bicycles. Tubes 33 are parallel to each other and orthogonal to arms 32. Each bicycle is indicated by a handlebar 59 and a seat 58 with a seat post 64. Bicycle attachments are shown enlarged in FIG. 2B. Handlebars 59 are attached using J-bolts 35 and wing nuts 36, as in the previous embodiment. Each seat post 64 is attached using a seatpost-clamp assembly 24. Each seatpost-clamp assembly 24 is made of a transverse tube 56, a horizontal J-bolt 65 inserted through a hole in a transverse tube 56, and a wing nut 36 which retains and adjusts J-bolt 65. Clamp assemblies 24 are attached across two tubes 33 as shown, using a bolt 57 and a nut 39 at each intersection.

Figure 2C:
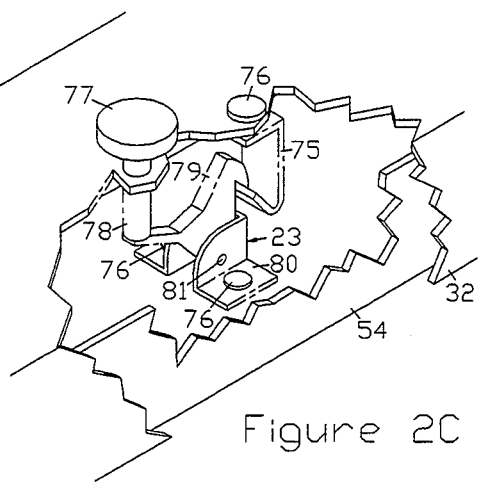
FIG. 2C is an enlarged view of the area indicated by line II—II of FIG. 2A, with material broken away to shown interior parts.

FIG. 2C is an exploded view of the area indicated by line II—II in FIG. 2A. It illustrates the parts which retain the rack in the closed position. Latch assembly 23 is a commonly available device consisting of a latch base 80 and a pawl 79. Pawl 79 is attached to base 80 by a latch axle 81. It is spring loaded to prefer the position shown, and can be rotated counter-clockwise. Latch assembly 23 is attached to channel 54 by a rivet 76 on each side. A catch 75 is attached to hinged arm 32 by a rivet 76. Catch 75 is located such that it engages pawl 79 when arm 32 is in the closed position. A button 77 with a rod 78 is inserted through a hole in arm 32 as shown. When pressed, it causes pawl 79 to rotate and disengage from catch 75.

Figure 3:
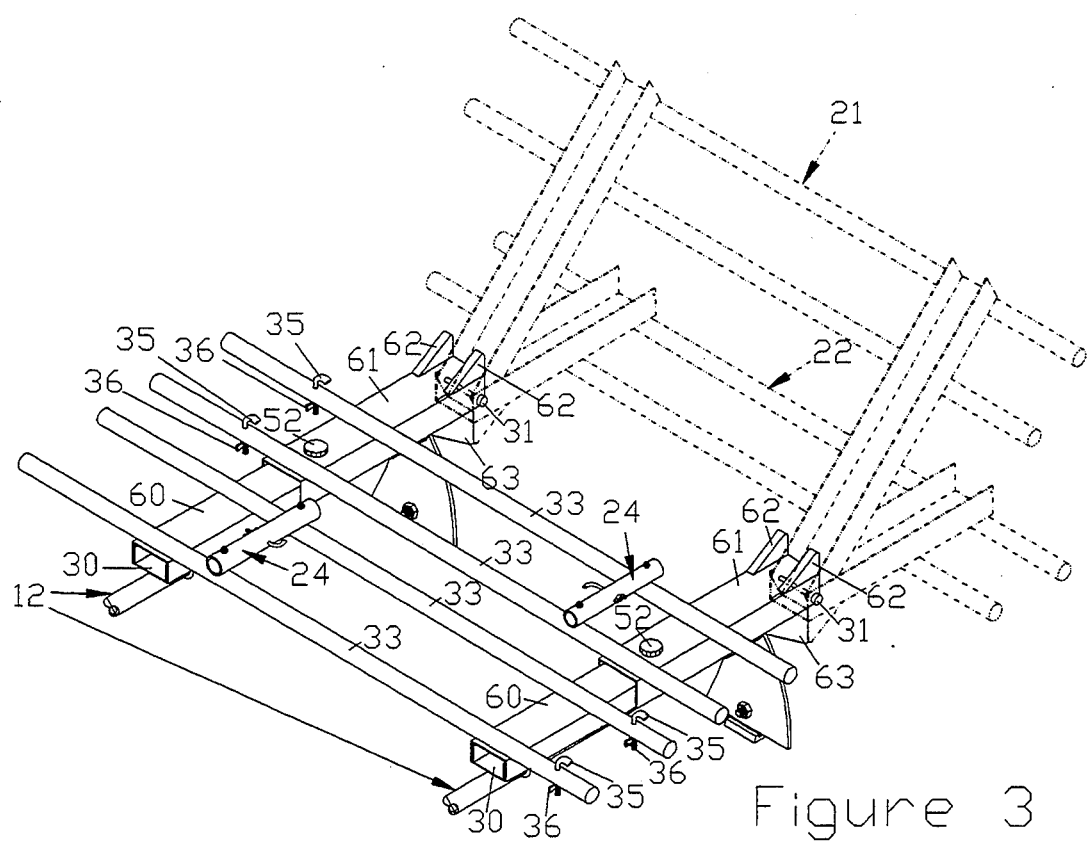
FIG. 3 is an isometric view of a carrier with individual, nested loading frames for each bicycle.

FIG. 3 illustrates a carrier which allows independent loading of two bicycles. This carrier has individual racks for each bicycle, arranged to nest together. As in the carrier of FIG. 1B, the base is made of fixed arms 30 which attach to utility carrier 12. An inner rack assembly 21 is made of two tubes 33 attached to two inner hinged arms 60, of the same length as arm 30. An outer rack assembly 22 is made similarly, of two tubes 33 and two outer hinged arms 61, of about half the length of arm 30. Both racks are attached to arms 30 by hinge pins 31. The racks are shown nested in the closed position; arm 61 fits over arm 60, which in turn fits over arm 30. Racks 21 and 22 can pivot independently. This is illustrated in phantom lines, where rack 22 is shown in the open position, and rack 21 is shown in an intermediate position. Bicycle attachments are the same as in FIG. 2B. Support in the open position is provided by abutment structure that prevents further pivoting. A fixed stop 63 is mounted to the bottom of fixed arm 30, near each edge. Its vertical edge is directly below the centerline of hinge pin 31. A hinged stop 62 is mounted to each outer hinged arm 61, near each edge. It abuts the corresponding fixed stop in the open position, as shown in phantom lines. Retaining the racks in the closed position is similar to the method used in the carrier of FIG. 1A. A knob 52 is retained in each outer hinged arm 61, just as in FIG. 1C. A standoff (not shown, but identical to standoff 50 in FIG. 1C) is mounted on fixed arm 30. A hole is provided through inner hinged arm 60, located to line up with knob 52 in the closed position. The threads of knob 52 pass through the hole in arm 60 and can be engaged with standoff 50.

Figure 4:
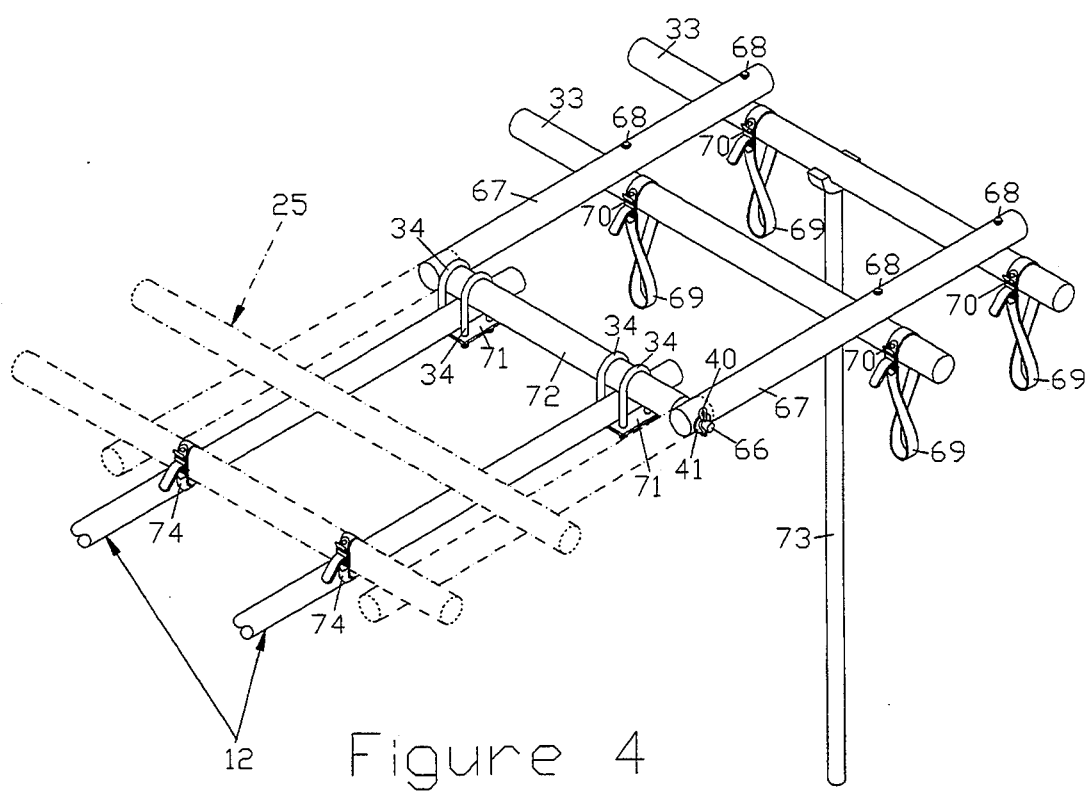
FIG. 4 is an isometric view showing an alternative embodiment configured for tandem bicycles.

FIG. 4 illustrates another embodiment for carrying a tandem bicycle. The base is provided by a longitudinal member, fixed tube 72. It attaches to utility carrier 12, which is partially shown. Attachment to each carrier bar of carrier 12 is by two U-bolts 34 and a plate 71. A fixed axle 66 extends from each end of tube 72. This provides attachment points for rack assembly 25, which allow it to pivot. Rack assembly 25 is made of two hinged tubes 67 attached to two tubes 33. Attachment is by a bolt 68 at each crossing. Each hinged tubes 67 fits on an axle 66 of fixed tube 72, and is secured by a washer 41 and a spring clip 40. Rack 25 rack is supported in the open position by a compressive member, crutch 73. One end of crutch 73 is designed to support tube 33, and the other end to stand on the ground. Four straps 69 with buckles 70 are shown to attach a tandem bicycle. These serve as flexible lengths of supporting material which can be tightened around the bicycle's handlebars, attaching them to tubes 33. Two straps 74 are shown to retain the carrier in the closed position.

Figure 5:
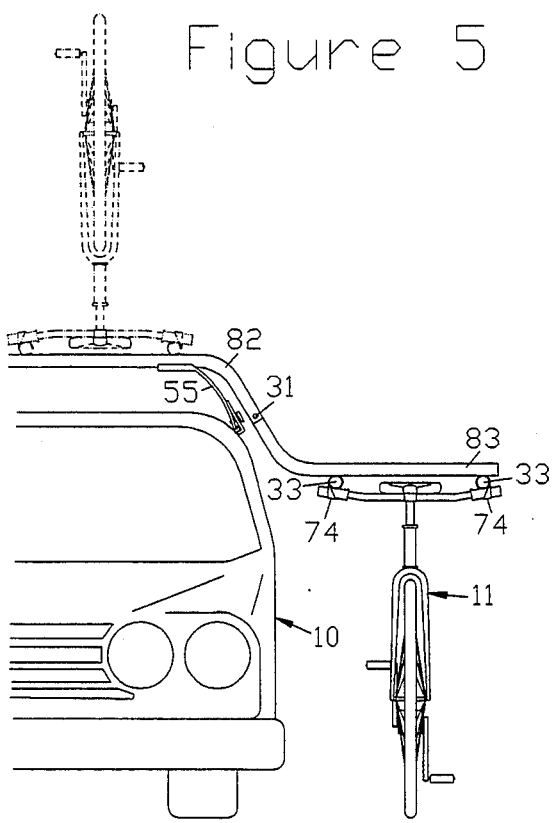
FIG. 5 is a front view of another embodiment.

FIG. 5 illustrates a carrier which uses the bicycle to support the open rack. One half of the carrier is shown, in front view; the other half would be a mirror image. A longitudinal base member 82 attaches to car 10 using mounts 55 near each end. A hinged member 83 attaches to member 82 using a hinge pin 31. Two such assemblies are used, one near the front and the other near the rear of the car's roof; the rear assembly is hidden in the view shown. Two longitudinal tubes 33 attach to hinged members 83, connecting the front and rear hinged members 83. This forms a rack assembly which provides attachment points for a bicycle 11. Bicycle 11 is attached using straps 74. The closed position is indicated in phantom lines.

OPERATION

The operation of the carrier shown in FIG. 1 will be described first, followed by a description of the unique aspects of operation of the other illustrated embodiments.

In preparation for loading, rack assembly 20 (FIG. 1A) is pivoted to the open position. In this position hinged posts 38 (FIG. 1C) are approximately vertical. Chords 37 are taut, supporting rack assembly 20 in the open position. Tandem bicycle 11 is rolled under rack assembly 20. Its front is lifted and front handlebars 13 are set in the front two J-bolts 35 (FIG. 1B). The rear of the bicycle is then lifted, and rear handlebars 14 are set in the remaining two J-bolts 35. The lifting is quite easy because only one end of the bicycle is raised at a time, and only to a convenient height. Once both handlebars 13 and 14 are resting in J-bolts 35, all four wing nuts 36 are tightened to clamp them in place.

The bicycle is next pivoted to the carrying position. It is grasped at any convenient low place and swung to the top of the vehicle. This is easier than might be expected because (a) at all points during its travel, much of the weight of the bicycle is borne by hinge pins 31, (b) the arc is completely controlled, so no effort is required for balancing or positioning the load, and (c) the bicycle itself provides leverage for pivoting the rack. Many people will be able to do this comfortably by themselves, even with the weight of a tandem bicycle. Others can team up with a partner; the control provided by the pivoting action makes it easy to coordinate this effort. This can be contrasted with the hazards of two people trying to free-lift an awkward tandem bicycle.

As the carrier is closed, each hinged post 38 (FIG. 1C) pivots to a concealed position between fixed arm 30 and hinged arm 32. Each chord 37 folds, also between fixed arm 30 and hinged arm 32. Folding is controlled by elastic chords 42 which pull the slack toward pulleys 49. In the closed position, knob 52 is screwed into standoff 50. This retains the carrier in the closed position.

Operation of the embodiment shown in FIG. 2A is similar. For loading, it is convenient to lift the rear end of a single bicycle first. This allows bicycle seat 58 to be maneuvered past tube 56. Horizontal J-bolt 65 is hooked loosely on seat post 64, then the front is lifted and the handlebars set in J-bolts 35. J-bolts 35 and horizontal J-bolt 65 are tightened by turning their wing nuts 36, securely attaching the bicycle. A second bicycle can be similarly attached as indicated in FIG. 2A. Raising the bicycles to the carrying position is the same as described in the previous embodiment. As arm 32 approach the closed position, catch 75 causes pawl 79 to rotate counterclockwise. As the closed position is reached pawl 79 clears the edge of catch 75 and rotates clockwise, engaging catch 75 and thereby retaining arm 32 in the closed position.

To load the carrier shown in FIG. 3, both outer rack assembly 22 and inner rack assembly 21 are pivoted to the open position. Outer rack assembly 22 is supported by hinged stop 62 abutting fixed stop 63. Inner rack assembly 21 is in turn supported by abutting rack assembly 22. A single bicycle is attached to inner rack assembly 21 as described above. It is then pivoted to the carrying position. It is convenient to temporarily raise outer rack 22 also, to keep it from getting in the way. Outer rack 22 is then returned to its open position. A second bicycle is attached to it, and it is pivoted to the closed position. Knob 52 is screwed into standoff 50 (FIG. 1C) as in the first embodiment, to retain the carrier.

Operation of the embodiment of FIG. 4 is also similar. When rack 25 is swung to the open position, crutch 73 is positioned to support it. A tandem bicycle is rolled under rack 25. The forward two straps 69 are looped around the front handlebars and buckled loosely. The rear two straps are similarly looped and buckled around the rear handlebars. All four straps are then tightened to attach the bicycle. The bicycle is pivoted to the carrying position as before. As the pivoting is started, crutch 73 is put aside. In the closed position a tube 33 rests against the bars of utility carrier 12. It can be secured there by two straps 74.

The operation of the carrier shown in FIG. 5 is only slightly different. In this case, the bicycle must be rolled into position before the rack is swung to the open position, because the bicycle supports the open rack. The bicycle is attached and raised as in the previous example. Tubes 33 can be strapped to member 82 to retain them in the closed position.

OPERATION AS A MAINTENANCE STAND

For maintenance, tandem bicycle 11 is attached to rack assembly 20 (FIG. 1B) as described above. Rack 20 is simply left in the open position. This supports tandem bicycle 11 at a convenient height for working, with the running gear free to operate. Operation as a maintenance stand is similar for the other illustrated embodiments, except for the carrier shown in FIG. 5. The bicycle of FIG. 5 is on the ground when attached, so its wheels aren't free to turn. Because of this the maintenance applications are more limited.

SUMMARY, RAMIFICATIONS, AND SCOPE

Thus the reader will see that this carrier provides a reliable, relatively simple device that considerably reduces the effort required to load bicycles. It takes advantage of the otherwise awkward geometry of the bicycle by attaching the bicycle very near its standing position, and by using the bicycle itself to gain leverage during lifting. In addition it has the advantage of carrying the bicycle securely, in a location above the vehicle where it is relatively protected from traffic. It also has the following important advantages:

The bicycle is loaded without any disassembly, such as the removal of a wheel. Removal of a wheel is required by many existing carriers. This has become more inconvenient with new safety devices designed to retain the wheels. Also, a removed wheel is an awkward and delicate item to store and transport.

The bicycle is secured by its handlebars which are often protected by grips or tape, and seat posts which are relatively mar resistant and are not key aesthetic features.

The carrier is adaptable to virtually any type of bicycle, including a tandem bicycle. It can be designed with built-in adjustments so a single model can accommodate a wide range of bicycles.

The carrier provides a unique bonus function by serving as a convenient work stand for performing bicycle maintenance.

These advantages are accomplished with a relatively simple device which can be produced inexpensively, making it suitable for use by typical bicycle hobbyists.

Although the description above contains many specifics, these should not be construed as limiting the scope of the invention; they merely provide illustrations of some of the currently preferred embodiments of this invention. For example other means could be used for securing the rack in its closed position, other means of attachment to the bicycle could be used, other means of attaching the carrier to a vehicle or utility carrier could be used, etc.

Thus the scope of the invention should be determined by the appended claims and their legal equivalents, rather than by the examples given.

I claim:

1. A carrier device for transporting at least one bicycle on a vehicle, comprising in combination:
    (a) a rack for receiving and supporting one or more bicycles,
    (b) a base mountable in a fixed substantially horizontal position to said vehicle,
    (c) mounting means to detachably secure said base in said fixed position on said vehicle,
    (d) connecting means for attaching said rack to said base comprising a substantially horizontal pivot axis having a substantially stationary location with respect to both said base and said rack, whereby said rack is pivotable about said pivot axis between a position wherein said rack is in a substantially horizontal carrying position substantially coplanar with said base over a roof of said vehicle and a position wherein said rack is in a substantially horizontal loading position substantially coplanar with said base and extending outward from said base.
    (e) supporting means for holding said rack with respect to said base in said loading position,
    (f) attaching means for removably securing one or more bicycles to said rack, and
    (g) releasable retaining means for securing said rack in said carrying position.

2. The carrier of claim 1 wherein said supporting means comprises a tensile member attached to a predetermined location on said rack and supported at a predetermined support location above said rack, whereby said rack is constrained from pivoting below said loading position.

3. The carrier of claim 2 wherein said support location comprises a predetermined location on a moveable suspension means connected to said base by a linking means, whereby said suspension means is movable between a stowed position substantially within an outline of said carrier when said carrier is in said carrying position and a suspension position in which said support location is above said rack.

4. The carrier of claim 3 wherein said linking means comprises a pivot, whereby said suspension means rotates between said stowed position and said suspension position.

5. The carrier of claim 1 wherein said supporting means comprises abutment means fixedly positioned on said rack which engages abutment means fixedly positioned on said base when said rack is in said loading position, whereby said rack is constrained from pivoting below said loading position.

6. The carrier of claim 1 wherein said supporting means comprises a compressive member extending from said rack to a location below said rack, whereby said compressive member constrains said rack from pivoting below said loading position.

7. The carrier of claim 1 wherein said mounting means comprises a plurality of mounts which removably attach to said vehicle.

8. The carrier of claim 1 wherein said mounting means comprises a plurality of mounts which removably attach to a utility carrier which is removably attached to said vehicle.

9. The carrier of claim 8 wherein said base comprises a plurality of arms, each of which attaches to said utility carrier.

10. The carrier of claim 8 wherein said utility carrier is of the type comprising spaced transverse carrier bars removably attached to said vehicle over said roof, substantially parallel to each other and transverse to a longitudinal centerline of said vehicle, and said base comprises a plurality of arms each of which attaches to one of said carrier bars.

11. The carrier of claim 1 wherein said rack comprises a plurality of arms of predetermined shape arranged substantially parallel to each other and transverse to said vehicle and attached to a plurality of longitudinal members of predetermined cross section which are substantially parallel to each other and to a longitudinal centerline of said vehicle.

12. The carrier of claim 1 wherein said connecting means comprises one or more coaxial pins inserted through holes of predetermined location in said base and said frame.

13. The carrier of claim 1 wherein said connecting means comprises one or more axles fixed to one member of the set consisting of said base and said frame, inserted through holes of predetermined location in the other member of said set.

14. The carrier of claim 1 wherein said attaching means comprises clamping means attached to said rack at predetermined locations which removably supportingly attach to predetermined parts of said bicycle.

15. The carrier of claim 1 wherein said attaching means comprises a plurality of flexible lengths of supporting material and means for tightening said lengths around predetermined parts of said bicycle, whereby said bicycle is secured to said rack.

16. The carrier of claim 1 wherein said retaining means comprises two mating fasteners located at predetermined locations on said rack and said base respectively whereby said fasteners can be engaged to constrain said rack in said carrying position.

17. The carrier of claim 1 wherein said retaining means comprises a spring-loaded pawl and mating catch at predetermined locations on said rack and said base, whereby said pawl engages said catch when said rack is pivoted to said carrying position.

18. The carrier of claim 1 wherein said retaining means comprises one or more flexible lengths of material and adjustable tightening means to secure said lengths around structural portions of said rack and structural portions fixed with respect to said vehicle, whereby said rack is constrained in said carrying position.

19. The carrier of claim 1 wherein said base comprises a longitudinal member attached parallel to a longitudinal centerline of said vehicle and said connecting means comprises securing means for attaching said rack to said longitudinal member whereby said rack is free to pivot about said member.

* * * * *